Jan. 15, 1963  W. A. ROWLETT  3,073,655
IDLER ARM REPAIR KIT
Filed Oct. 2, 1961  2 Sheets-Sheet 1
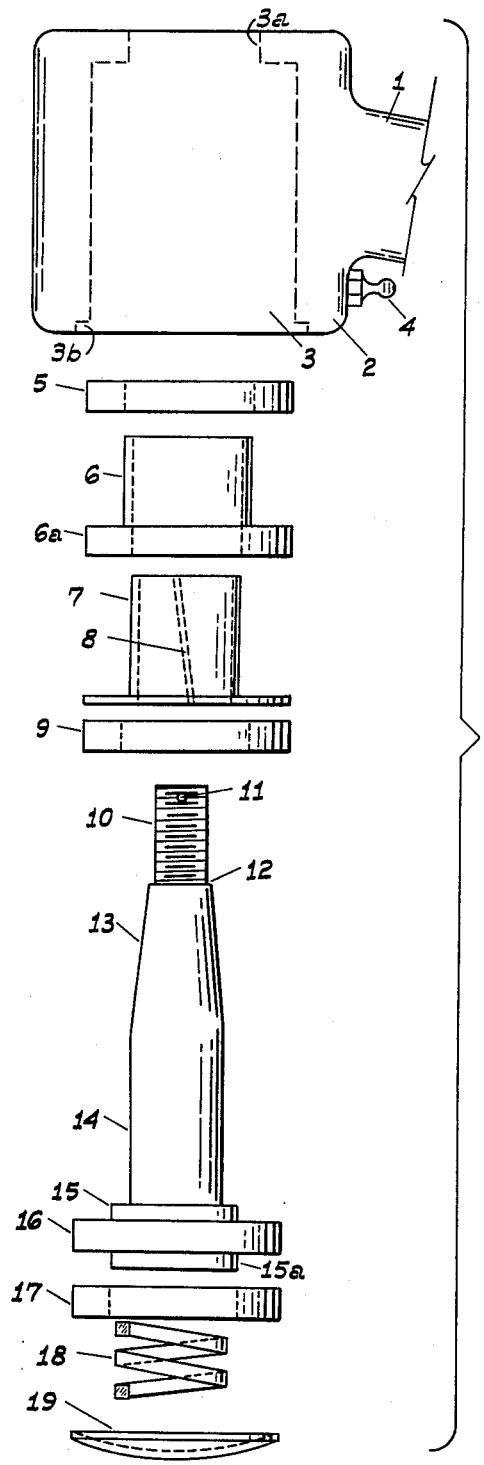
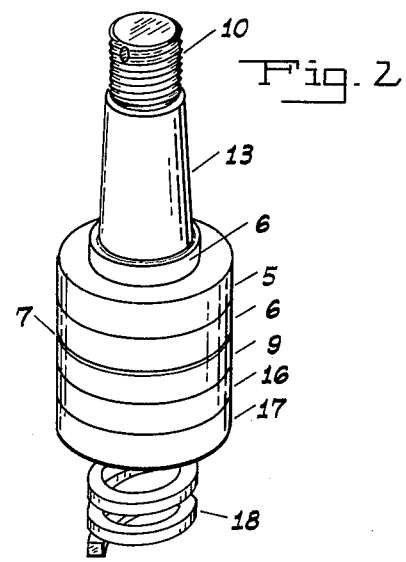
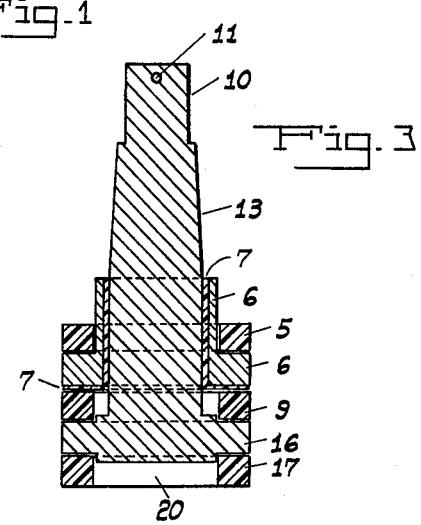
Willard A. Rowlett
INVENTOR.
BY Floyd Trimble
Attorney Jan. 15, 1963
W. A. ROWLETT
3,073,655
IDLER ARM REPAIR KIT
Filed Oct. 2, 1961
2 Sheets-Sheet 2
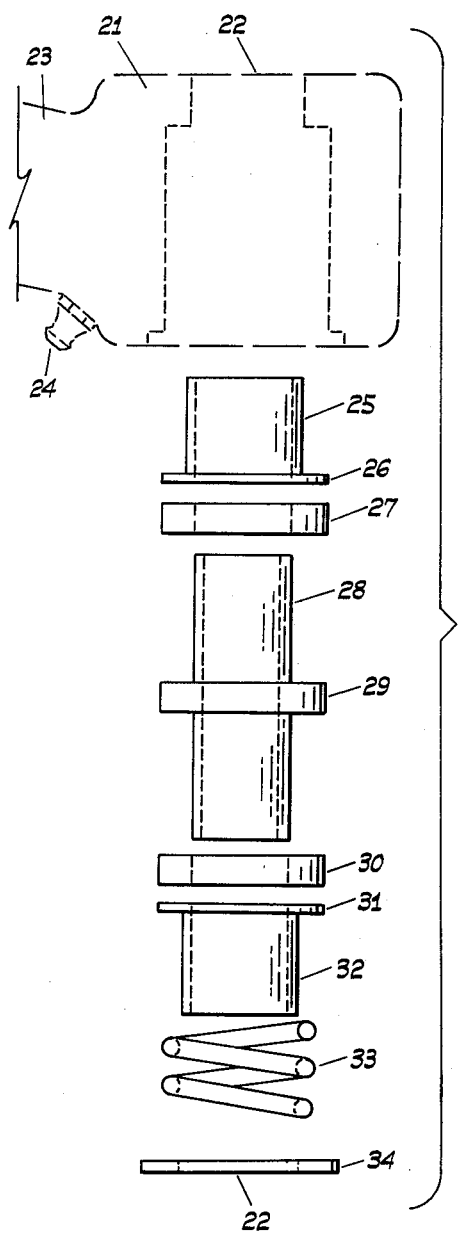
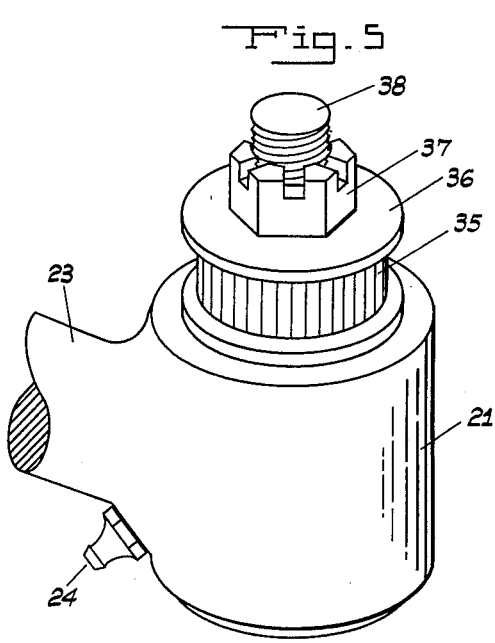
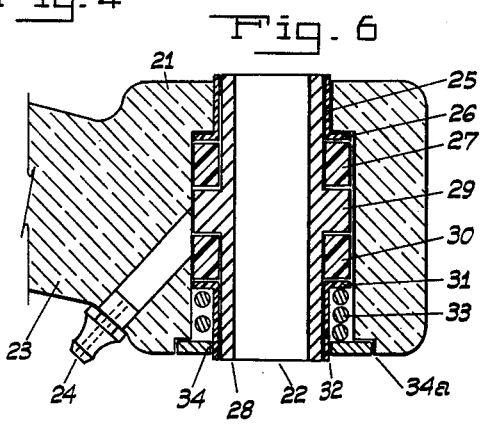
Willard A. Rowlett
INVENTOR.
BY Floyd Trimble
Attorney United States Patent Office 3,073,655
Patented Jan. 15, 1963

3,073,655
IDLER ARM REPAIR KIT
Willard A. Rowlett, 6809 NW. 53rd St., Bethany, Okla.
Filed Oct. 2, 1961, Ser. No. 142,224
6 Claims. (Cl. 308—135)

This invention relates to idler arm devices for use with automobiles and more particularly it relates to a repair kit for use with such devices.

It is conventional practice at present to equip the right hand end portion of the tie-rod connecting the front wheels with an idler arm. The idler arm comprises a relatively short member which is pivotally attached at one end to the adjacent right hand end portion of the tie-rod and is pivotally connected at its opposite end to a bracket carried by the frame of the vehicle. The purpose of the idler arm is to add support and stability to the steering mechanism and to effect easier steering of the vehicle. Because of the almost continuous oscillating movement of the idler arm relative to the bracket it is difficult to maintain a wear free snug pivoting connection between these two members with conventional equipment.

In an attempt to overcome the foregoing objections it has been proposed that resilient bushings be used to provide a snug pivoting connection. This has not been entirely satisfactory because such bushings tend to deteriorate with age. It has also been proposed that the resilient bushings be replaced with metal bearings. While the use of metal bearings does eliminate the necessity of employing resilient bushings rather frequent lubrication of such bearings is required.

It is, therefore, a principal object of the present invention to provide an idler arm repair kit that obviates the disadvantages of the prior art kits of this character.

It is another object of my invention to provide an idler arm connection of this class that will permit easier and more positive steering of the vehicle than has heretofore been possible.

It is another object of this invention to provide a repair kit of this type which utilizes to the maximum extent the conventional equipment of the vehicle.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings in which like numerals are employed to designate like parts throughout, setting forth in detail certain illustrative embodiments of the invention these being indicative, however, of but a few of the various ways in which the principle of the invention may be employed.

In said annexed drawings:

FIGURE 1 is an elevational exploded view of the device illustrating the relative position of the parts thereof constructed in accordance to one aspect of the invention;

FIGURE 2 is a perspective view of the assembled bearing;

FIGURE 3 is an elevational view in cross-section of the assembled bearing;

FIGURE 4 is an elevational exploded view of the device illustrating the relative position of the parts thereof constructed in accordance to another aspect of the invention;

FIGURE 5 is a perspective view showing the device constructed in accordance to the invention illustrated in FIGURE 4 installed in one type of idler arm; and FIGURE 6 is an elevational view in cross-section showing the bearing illustrated in FIGURE 3 positioned in the idler arm.

In brief, the foregoing objects are attained by providing a bore extending through a point near each end of the idler arm boss portion wherein a portion of that bore is enlarged and according to one aspect of the invention the bearing which is positioned within the bore in the idler arm comprises a shaft having a flange adjacent one end thereof and a portion of the opposite end thereof is externally threaded. From a point about midway between the two ends thereof to a point in proximity to the threaded portion the shaft tapers inwardly toward the threaded portion. An inner elongated sleeve one end of which is flanged and has a bore the diameter of which is such that it will fit closely over the shaft provides a bearing surface. An outer elongated sleeve one end of which is provided with a flange and a bore the diameter of which is such that it will fit closely over the inner elongated sleeve is positioned on the inner sleeve. In assembling an anti-friction washer is positioned on the shaft adjacent the flange on the shaft, next the inner elongated sleeve is placed thereon so that flange on this sleeve is adjacent the anti-friction washer, the outer elongated sleeve is fitted on the inner sleeve so that the flange on this sleeve is adjacent the anti-friction washer, the outer elongated sleeve is fitted on the inner sleeve so that the flange on the outer sleeve is adjacent the flange on the inner sleeve. A second anti-friction washer is placed on the outer sleeve. A third anti-friction washer is placed on the end of the shaft opposite the threaded portion after which the assembled bearing is inserted into the bore in the idler arm. The outer diameters of the anti-friction washers are such that they are closely received within the enlarged portion of the bore in the idler arm. Finally a spring held in place by means of a Welch plug serves to hold the bearing within the bore and also to provide the necessary resiliency for proper operations.

Alternately the foregoing objects of the invention are attained by providing a bore extending through a point near each end of the idler arm boss portion wherein a portion of that bore is enlarged and the bearing which is positioned within the bore in the idler arm comprises an elongated inner sleeve provided with a flange intermediate the ends thereof. Preferably this flange is located at a point approximately midway between the two ends of the sleeve. An outer elongated sleeve one end of which is flanged and has a bore the diameter of which is such that it will fit closely over one end of the inner sleeve provides a bearing surface. The outer diameter of the outer sleeve is such that it will be closely received within the unenlarged portion of the bore in the idler arm. A similar outer sleeve is provided to fit over the outer end of the inner sleeve. In assembling the outer sleeves on the inner sleeve the former are so placed that the flanges thereon are toward the flange on the inner sleeve and an anti-friction washer is placed on the inner sleeve on each end of the inner sleeve and adjacent the flange thereon. The outer diameters of the flanges on the outer elongated sleeves and the anti-friction washers are such that they are closely received within the enlarged bore in the idler arm. A spring adapted to fit freely around the second mentioned outer sleeve and fit freely within the enlarged portion of the bore held in place by means of a Welch plug or similar device complete the bearing.

Referring to the drawings and to FIGURES 1, 2 and 3 in particular the numeral 14 denotes a shaft one end of which is provided with a flange 16 and collars 15 and 15a, the other end of which is threaded as indicated by the numeral 10. The threaded portion terminates at the shoulder 12. From a point approximately midway between the two ends of the shaft the shaft tapers inwardly toward the threaded end wherein the taper ends at shoulder 12. The numeral 13 denotes the tapered portion of the shaft. This shaft is constructed from a metal, preferably a high grade steel. In assembling the first item to be installed on the shaft is the anti-friction washer 9, then the inner elongated sleeve 7 which is provided with the lubrication grooves 8. Next the elongated outer sleeve 6, constructed from metal, preferably steel, is positioned over the inner sleeve 7 followed by inserting the anti-friction washer 5 on sleeve 6. As illustrated the two sleeves are so placed that the flanges on these two sleeves are adjacent flange 16 on shaft 14. After the bearing has been assembled it is inserted into bore 3 of the enlarged portion 2 (boss) of idler arm 1. After inserting the assembled bearing into the bore anti-friction washer 17 is placed on shoulder 15a, spring 18 partly inserted into the opening in washer 17 which is held in place by means of the Welch plug 19. The diameter of plug 19 is such that it will fit tightly in the groove 3b and can be securely fitted therein by spinning or other means well known to those skilled in the art. When installed spring 18 permits a small amount of movement in the direction of the longitudinal axis of shaft 14. This movement is essential for the best operation of the idler arm. Item 4 is a lubricating fitting.

Preferably the elongated inner sleeve 7 and the anti-friction washers 5, 9 and 17 are constructed from an anti-friction plastic and as such provides the necessary bearing surface for the metal parts. The internal diameter of sleeve 7 is such that it makes for a rather close fit over shaft 14. Elongated outer sleeve 6 as pointed out above fits over the inner sleeve 7. The outside diameter of the outer sleeve 6 is such that it will fit closely in bore 3a. The length of sleeve 6 is such that it will project slightly beyond the opening 3a.

An important feature in my invention is the use of the anti-friction washers 5, 9 and 17 and inner sleeve 7. These members must be constructed of a material that will meet the following criteria:

(1) Be anti-friction.
(2) Capable of withstanding considerable pressure.
(3) Possess a high degree of sealing action.

The first criterion is important because there is considerable movement of the idler arm. Since the bearing is subjected to considerable pressure, the material used in constructing the various items must be one that is capable of withstanding rather excessive compressive forces. Because the unit must be lubricated the material used should possess sealing properties to a rather extensive degree to aid in the retention of the lubricant on the bearing surfaces. Furthermore efficient sealing means that dust and moisture are prevented from entering the bearing. Materials which I have found to be particularly suitable for use in the construction of members 5, 7, 9 and 17 are certain resins derived from petroleum of which the product available commercially under the trade name Marlex is particularly suitable. Other resins which may be used include Teflon, nylon, Delrin and Lexan.

This type of bearing as described above and illustrated in FIGURES 1, 2 and 3 is suitable as an example for use with an idler arm of the type designated STL-1 in the catalog of the Safe-T-Lign Company of Oklahoma City on automotive products or the idler arm designated PN-600 as disclosed in the catalog of the Perfect Equipment Corporation of Kokomo, Indiana. This type of idler arm fits the 1958 through 1960 Chevrolet.

For best operation the outer diameters of the anti-friction washers 5, 9 and 17 are such that they fit closely within the enlarged portion bore 3 and that of the metal flanges 6 and 16 are a few thousandths of an inch less. This insures that there will be no metal to metal contact in the bearing surfaces.

Now referring to FIGURES 4, 5 and 6 there is illustrated a bearing constructed in accordance to another aspect of my invention. This particular bearing is suitable as one example for use with the idler arm for Chevrolet passenger cars 1955 through 1957. Such an idler arm is illustrated in the Perfect Equipment Corporation's catalog under the catalog number PN-603. This bearing comprises the inner sleeve 28 provided with a flange 29 positioned at the midpoint thereof. This sleeve is constructed of metal, preferably steel. The length of sleeve 28 is such that it will project beyond the surface of the end of idler arm 21 as is illustrated in FIGURE 6. Anti-friction washers 27 and 30 are adapted to fit closely over sleeve 28 and are positioned adjacent to and on either side of flange 29. Outer elongated sleeves 25 and 32 are adapted to fit closely over either end of sleeve 28. Preferably outer sleeves 25 and 32 are identical for economy of manufacture. They may, however, be different if desired. These sleeves 25 and 32 are positioned on inner sleeve 28 so that the flanges 26 and 31 are adjacent anti-friction washers 27 and 30 respectively. The outer diameter of sleeve 25 is such that it will be snugly received in the unenlarged portion of the bore 22. After assembling the bearing it is inserted into the bore 22, spring 33 placed over and around 32 and secured in place by means of the washer 34 resting on lip or ledge 34a. Washer 34 is secured in place by spinning or other means well known to those skilled in the art.

Sleeves 25 and 32 and anti-friction washers 27 and 30 are constructed of a material that will meet the criteria listed in respect to anti-friction washers 5, 9 and 17 and inner sleeve 7. Suitable materials are the same as cited for those items.

The outer diameters of the anti-friction washers 27 and 28 are such that they will fit snugly within the enlarged portion of the bore 22. Metal flange 29 has an over all diameter slightly less than that of the washers 27 and 30. This insures that there will be no metal to metal contact in the bearing surfaces.

As illustrated in FIGURE 6 the inner sleeve 28 and outer sleeves 25 and 32 project through the bore 22 in the boss of the idler arm and beyond the surface thereof.

In operation the bearing disclosed in FIGURES 1, 2 and 3 is assembled as described above. The bore 3 of the idler arm boss 2 is drilled from one end to receive closely the anti-friction washers 5, 9 and 17. A portion of the bore is of reduced diameter and it is adapted to receive closely the metal elongated sleeve 6. As mentioned above the depth of the idler arm bore 3 is such that when the bearing is pressed into the bore, sleeves 6 and 7 project beyond the idler arm a slight distance, approximately $\frac{1}{32}$ of an inch.

Referring to FIGURES 4, 5 and 6 the bore 22 of the idler arm boss 21 is drilled from one end to receive closely the assembled bearing. A portion of the bore is of reduced diameter and it is adapted to receive closely elongated sleeve 25. As mentioned above the depth of the idler arm bore is such that when the bearing is pressed into the bore, sleeves 28, 25 and 32, the adjacent ends of sleeve 28 and the ends of sleeves 25 and 32 will project beyond the idler arm a slight distance, approximately $\frac{1}{32}$ of an inch.

For further background on the operation of an idler arm reference is made to U.S. Patent 2,826,466 dated March 11, 1958, issued to Arnold J. Pritchard and my co-pending application Serial No. 62,733 filed October 14, 1960, now Patent No. 3,030,136 issued April 17, 1962, entitled "Combination Coupling and Sleeve Bearing" which references are hereby made a part of this application.

An idler arm repair kit constructed in accordance to my invention and installed on a motor vehicle possesses the following advantages:

(1) It is sealed thus preventing the entrance of moisture or dust into the bearing.
(2) Lubrication required only at intervals of 20,000 miles.
(3) Will operate in entirely satisfactory manner even when the drag link (original equipment on the vehicle)

is bent causing misalignment of the idler arm. Under such conditions the arm assembly may oscillate freely without any tendency of binding.

(4) The arm assembly is free to move in a vertical direction of about 1/32 of an inch thus absorbing road shocks.

(5) Will eliminate or greatly reduce toe-in change normally caused by a loose idler arm.

(6) Is self adjusting and as a consequence will not require further adjustment after use.

(7) Provides easy steering, has the feel of power steering.

(8) Will not become egg shaped or elongated through wear.

In summation this repair kit when installed on a motor vehicle will absorb road shocks within itself thus reducing the effects of road shock at the steering wheel. Furthermore since the anti-friction bearings are spring loaded, the idler arm can move upward or in a vertical direction. This not only absorbs road shocks but prevents damage to the bearings which may occur under extreme driving conditions such as high speed driving over rough roads or striking a curb with the front wheel.

It is also possible to provide an idler arm assembly using my kit that will require no further lubrication through out the life of the vehicle. This is possible if the bearing is first lubricated with one of the long life bearing greases when the unit is assembled followed by coating the Welch plug with a latex resin after which the plug is installed in the unit as described above.

Other modes of applying the principle of the invention may be employed, change being made as regards the details described, provided the features stated in any of the following claims or the equivalent of such be employed.

I, therefore particularly point out and distinctly claim as my invention:

1. A bearing for joining a first member and a second member for relative pivoting movement wherein each end of said first member has a bore extending therethrough and a portion of said bore is enlarged for receiving said bearing comprising: a shaft having a flange adjacent one end thereof and a portion of the opposite end thereof is externally threaded and said shaft from a point about midway between the two ends thereof to a point in proximity to said threaded portion tapers inwardly toward said threaded portion, an inner elongated sleeve member having a flange on one end thereof and having a bore closely receiving said shaft and forming a bearing surface, an outer elongated sleeve member having a flange on one end thereof and having a bore closely receiving said inner sleeve, a washer interposed on said shaft between the flange on said shaft and the flange on said inner sleeve and a second washer interposed on said outer sleeve adjacent the flange thereon wherein the outer diameter of said outer sleeve is such that said sleeve is adapted to be closely received in the unenlarged portion of the bore in said first member, a washer disposed on the flange end of said shaft in juxtaposition to said flange, characterized in that the outer diameters of said flanges on said elongated sleeve members and said washers are such that the same are closely received by the enlarged bore portion said first member and lacking means for securing said bearing in said first member characterized further in that a spring adapted to be freely received within the enlarged bore portion of said first member is interposed between the flange end of said shaft and said lacking means.

2. A bearing for joining a first member and a second member for relative pivoting movement wherein each end of said first member has a bore extending therethrough and a portion of said bore is enlarged for receiving said bearing comprising: a shaft having a flange adjacent one end thereof and a portion of the opposite end thereof is externally threaded and said shaft from a point about midway between the two ends thereof to a point in proximity to said threaded portion tapers inwardly toward said threaded portion, an inner elongated sleeve member constructed from an anti-friction material, having a flange on one end thereof and having a bore closely receiving said shaft and forming a bearing surface, an outer elongated sleeve member having a flange on one end thereof and having a bore closely receiving said inner sleeve, a washer constructed from an anti-friction material, interposed on said shaft between the flange on said shaft and the flange on said inner sleeve and a second washer, constructed from an anti-friction material, interposed on said outer sleeve adjacent the flange thereon wherein the outer diameter of said outer sleeve is such that said sleeve is adapted to be closely received in the unenlarged portion of the bore in said first member, a washer, constructed from an anti-friction material, disposed on the flange end of said shaft in juxtaposition to said flange, characterized in that the outer diameters of said flanges on said elongated sleeve members and said washers are such that the same are closely received by the enlarged bore portion said first member and lacking means for securing said bearing in said first member characterized further in that a spring adapted to be freely received within the enlarged bore portion of said first member is interposed between the flange end of said shaft and said lacking means.

3. A bearing for joining a first member and a second member for relative pivoting movement wherein each end of said first member has a bore extending therethrough and a portion of said bore is enlarged for receiving said bearing comprising: a shaft having a flange adjacent one end thereof and a portion of the opposite end thereof is externally threaded and said shaft from a point about midway between the two ends thereof to a point in proximity to said threaded portion tapers inwardly toward said threaded portion, an inner elongated sleeve member having a flange on one end thereof and having a bore closely receiving said shaft and forming a bearing surface, an outer elongated sleeve member having a flange on one end thereof and having a bore closely receiving said inner sleeve, a washer interposed on said shaft between the flange on said shaft and the flange on said inner sleeve and a second washer interposed on said outer sleeve adjacent the flange thereon wherein the outer diameter of said outer sleeve is such that said sleeve is adapted to be closely received in the unenlarged portion of the bore in said first member, a washer disposed on the flange end of said shaft in juxta-positon to said flange, characterized in that the outer diameters of said flanges on said elongated sleeve members and said washers are such that the same are closely received by the enlarged bore portion said first member and the flange on said shaft has an outer diameter of less than that of said washers and lacking means for securing said bearing in said first member characterized further in that a spring adapted to be freely received within the enlarged bore portion of said first member is interposed between the flange end of said shaft and said lacking means.

4. A bearing for joining a first member and a second member for relative pivoting movement wherein each end of said first member has a bore extending therethrough and a portion of said bore is enlarged for receiving said bearing comprising: an elongated inner sleeve having a flange intermediate its ends, an outer elongated sleeve having a flange on one end thereof having a bore closely receiving one end portion of said inner sleeve and forming a bearing surface, a washer interposed between the flange on said inner sleeve and the flange on said outer sleeve wherein the outer diameter of said outer sleeve is such that said sleeve is closely received by the unenlarged portion of the bore in said first member, a second outer elongated sleeve having a flange on one end thereof, having a bore closely receiving the other end portion of said inner sleeve and forming a bearing surface, a washer interfaced between the flange of the second outer elongated sleeve and the flange on said inner sleeve, characterized further in that the outer diameters of the flanges on the outer elongated sleeves and of the washers are such that they are closely received by the enlarged bore portion in said first member, a spring adapted to fit freely around said second outer elongated member and within said enlarged portion of the bore in said first member and lacking means for securing said bearing in said first member.

5. A bearing for joining a first member and a second member for relative pivoting movement wherein each end of said first member has a bore extending therethrough and a portion of said bore is enlarged for receiving said bearing comprising: an elongated inner sleeve having a flange intermediate its ends, an outer elongated sleeve having a flange on one end thereof constructed from an anti-friction material, having a bore closely receiving one end portion of said inner sleeve and forming a bearing surface, a washer constructed from an anti-friction material, interposed between the flange on said inner sleeve and the flange on said outer sleeve wherein the outer diameter of said outer sleeve is such that said sleeve is closely received by the unenlarged portion of the bore in said first member, a second outer elongated sleeve having a flange on one end thereof constructed from an anti-friction material, having a bore closely receiving the other end portion of said inner sleeve and forming a bearing surface, a washer, constructed from an anti-friction material interposed between the flange of the second outer elongated sleeve and the flange on said inner sleeve, characterized further in that the outer diameters of the flanges on the outer elongated sleeves and of the washers are such that they are closely received by the enlarged bore portion in said first member, a spring adapted to fit freely around said second outer elongated member and within said enlarged portion of the bore in said first member and lacking means for securing said bearing in said first member.

6. A bearing for joining a first member and a second member for relative pivoting movement wherein each end of said first member has a bore extending therethrough and a portion of said bore is enlarged for receiving said bearing comprising: an elongated inner sleeve having a flange intermediate its ends, an outer elongated sleeve having a flange on one end thereof having a bore closely receiving one end portion of said inner sleeve and forming a bearing surface, a washer interposed between the flange on said inner sleeve and the flange on said outer sleeve wherein the outer diameter of said outer sleeve is such that said sleeve is closely received by the unenlarged portion of the bore in said first member, a second outer elongated sleeve having a flange on one end thereof having a bore closely receiving the other end portion of said inner sleeve and forming a bearing surface, a washer interposed between the flange of the second outer elongated sleeve and the flange on said inner sleeve, characterized further in that the outer diameters of the flanges on the outer elongated sleeves and of the washers are such that they are closely received by the enlarged bore portion in said first member, and the flange on said inner sleeve has an outer diameter of less than that of said washers, a spring adapted to fit freely around said second outer elongated member and within said enlarged portion of the bore in said first member and lacking means for securing said bearing in said first member.

References Cited in the file of this patent
UNITED STATES PATENTS 2,846,251    Herbenar               Aug. 5, 1948